United States Patent Office 3,649,623
Patented Mar. 14, 1972

3,649,623
α:β-DI-[5-METHYL-BENZOXAZOLYL-(2)]-ETHYL-
ENE OPTICAL BRIGHTENING AGENT
Franz Ackermann, Binningen, Max Duennenberger, Frenkendorf, and Adolf Emil Siegrist, Basel, Switzerland, assignors to Intracolor Corporation, Fair Lawn, N.J.
No Drawing. Continuation-in-part of application Ser. No. 295,224, July 15, 1963, which is a continuation-in-part of application Ser. No. 80,036, Jan. 3, 1961, which in turn is a continuation-in-part of application Ser. No. 591,277, June 14, 1956. This application Dec. 22, 1965, Ser. No. 515,749
Claims priority, application Switzerland, June 17, 1955, 21,053/55
Int. Cl. C07d 85/48
U.S. Cl. 260—240 E                           1 Claim

ABSTRACT OF THE DISCLOSURE

This invention relates to a new and very useful crystalline product of manufacture consisting of pure α:β-di-[5-methyl-benzoxazolyl-(2)]-ethylene of the formula (1)
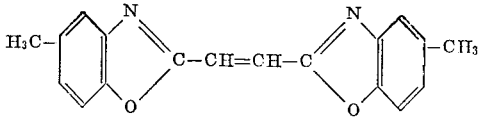

which exists in the form of fine yellowish needles, melts at 183 to 184° C., shows an ethanol solution extinction maxima at the wave lengths of λ=350 mµ, λ=362 mµ and λ=380 mµ, exhibits in dioxane solution a bluish fluorescence, is free from any staining effect and is a highly active optical brightening agent, which exerts an optical brightening effect on textile fibers made from polyamide, polyester, cellulose acetate or cellulose, when applied to said fibers in an aqueous bath as a detergent preparation obtained by spray drying a homogeneous aqueous preparation containing the detergent and the said α:β-di-[5-methyl-benzoxazolyl-(2)]-ethylene.

---

This is a continuation-in-part of our application Ser. No. 295,224, filed July 15, 1963, now abandoned, which in turn is a continuation-in-part of our application Ser. No. 80,036, filed Jan. 3, 1961, now abandoned, which, in turn, is a continuation-in-part of our prior application, Ser. No. 591,277, filed June 14, 1956, now abandoned.

Example 5 of U.S. Pat. 2,483,392 to Jules Meyer et al. describes the manufacture of α:β-di-[benzoxazolyl-(2)]-ethylene as follows:

A solution of 2.6 parts of α:β-di-[benzoxazolyl-(2)]-ethane in 10 parts of glacial acid is gently boiled with a solution of 6.8 parts of mercuric acetate in 15 parts of glacial acetic acid for one hour. The solvent is then removed by distillation under reduced pressure. The residue is extracted by boiling with 100 parts of chloroform, filtered, and the solvent is removed by distillation. The residue so obtained is boiled for a short time with an aqueous-alcoholic solution of sodium carbonate for the purpose of separating the dehydrogenation product which is free from mercury, the whole is filtered, and the filter residue is washed until the washings have a neutral reaction. For the purpose of further purification the resulting α:β-di-[benzoxazolyl-(2)]-ethylene of the formula

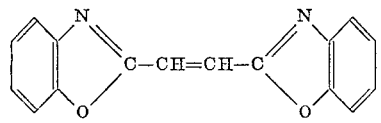

is recrystallised from alcohol, whereupon it is obtained in the form of a brick-red powder.

We have prepared α:β-di-[benzoxazolyl-(2)]-ethylene following the identical process described in Example 5 of U.S. Pat. 2,483,392, and have also obtained a brick-red powder, which we have found, even after further treatment with alcohol for the purpose of purification, remained impure and was completely useless for optically brightening e.g. polyester fibers such as Terylene which is stained.

We have also attempted to prepare the α:β-di-(5-methylbenzoxazolyl-(2)]-ethylene following the same procedure as described in Example 5 of U.S. Pat. 2,483,392 for the unsubstituted compound, and could only obtain a product which was also impure and practically useless for optically brightening e.g. polyester fibers to which it imparts a stain. Although a product may be fluorescent, if it stains the material to which it is applied, it is practically useless as an optical brightening agent. To be a useful optical brightener the product must not only show a blue to violet fluorescence in daylight or in ultraviolet light but it must not stain, or in any appreciable way stain, the material to which it is applied. Even small quantities of colored impurities that practically do not alter the melting point may be detrimental to the brightening effect.

We have found that when the α:β-di-[5-methylbenzoxazolyl-(2)]-ethylene is prepared by either of the following two processes I and II, the compound is obtained in a pure form, is free from any staining action, and is highly effective as an optical brightening agent;

(I) The symmetrical acylamino compound of the formula (2)
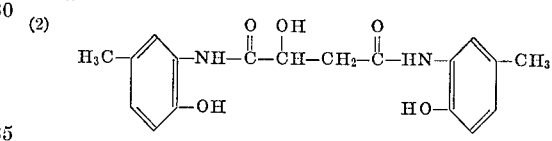

is treated at a temperature ranging from 160 to 170° C. with zinc chloride to split off water from the grouping

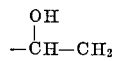

and to effect oxazole ring closures. The compound of the Formula 2 can be obtained by condensing malic acid at both carboxyl groups with 1-amino-2-hydroxy-5-methylbenzene in the presence of an inert organic solvent such, for example, as chlorobenzene, at a raised temperature.

(II) Two molecular proportions of 1-amino-2-hydroxy-5-methyl-benzene are condensed at a temperature ranging from 100 to 200° C. with one molecular proportion of malic acid and, without separating the condensation product, ring closure is brought about with the aid of a catalyst, such as boric acid or para-toluene sulfonic acid, to form the idoxazolyl-compound, and water is split off the —CHOH—CH₂-group of the malic acid radical. As the reactions are carried out at a raised temperature, it is desirable to use high boiling solvents, for example substitution products of benzene or more especially high boiling hydrocarbons of the benzene series, such as toluene, xylenes or cumene. It is of advantage to work at the boiling temperature in one of the aforesaid solvents, and to distil the solvent and remove the water or reaction from the distilled solvent by means of a water separator and return the solvent free from water to the reaction mixture. When the reactions are complete the resulting α:β-di-[5-methyl-benzoxazolyl-(2)]-ethylene of the Formula 1 can be isolated from the reaction mixture by methods in themselves known, and obtained in pure form by recrystallization from an organic solvent as shown in Examples 1 to 3 herein.

The new product of the Formula 1 having the aforesaid properties is suitable for optically brightening a very wide variety of organic materials. Good results are obtained, for example, in brightening lacquers, such as alkyd resin lacquers or nitrocellulose ester lacquers, and also films. However, the product of the present invention is primarily suitable for brightening synthetic fibers, for example, those of cellulose esters, such as cellulose acetate, artificial silk, or of polyacrylonitrile ("Orlon") or polyvinyl chloride ("Thermovyl," "Dynel") or especially polyesters ("Terylene," "Dacron").

The materials to be optically brightened may be treated with the new product of the present invention by the usual, known methods. Textile fibers are advantageously brightened in an aqueous medium in which the new product is suspended, advantageously in the form of a fine dispersion. The new product of the Formula 1 is distinguished by its excellent brightening action, especially on the aforesaid materials, such as polyesters, and by its very good fastness to light.

Very valuable brightening effects can also be obtained on textile fibers of the most various compositions, for instance fibers made from polyester, polyamide, cellulose acetate (2½ or triacetate) polyvinylchloride, polypropylene or mixtures of said fibers when the compound of the Formula 1 is applied to the fibers in an aqueous bath in combination with a detergent as follows: The compound of Formula 1 is dissolved in a surface-active product, preferably a non-ionic one, and the solution is mixed with an aqueous detergent solution. The mixture can be added to water for the treatment of the fibers, if desired after spray-drying.

The following table shows the differences in properties of $\alpha:\beta$-di-[5-methylbenzoxazolyl-(2)]-ethylene (A) when prepared by one of the two methods described above under I and II, and in Examples 1 to 3 and (B) when prepared in strict analogy to the process described by Meyer et al. in Example 5 of U.S. Pat. 2,483,392.

| | Melting point, °C. | Appearance | Brightening effect on polyester (Terylene) |
|---|---|---|---|
| (A) | 183-184 | Fine yellowish needles | Very strong. |
| (B) | 170-212 | Reddish (salmon colored) powder. | Practically no brightening effect. |

The following examples illustrate the invention, the parts and percentages being by weight unless otherwise stated and the relationship of parts by weight to parts by volume being the same as that of the kilogram to the liter. The melting points are not corrected.

EXAMPLE 1

30 parts of the acyl compound of the formula (3) 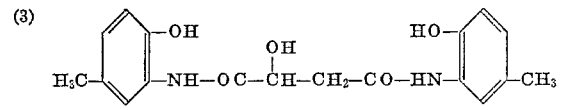

are added to a melt of 10 parts of water and 150 parts of zinc chloride at 160 to 170° C., and then the mixture is maintained at that temperature for 10 to 18 hours. 600 parts of cold water are added dropwise, during which the temperature is allowed to fall. Hydrochloric acid is added to produce an acid reaction, the mixture is stirred for one hour at 80 to 100° C., and the product obtained is filtered off, washed with water and dried. After being recrystallized from a mixture of methylene chloride and ethanol, the $\alpha:\beta$-di-[5-methyl-benzoxazolyl-(2)]-ethylene is in the form of fine yellowish needles which melt at 183 to 184° C. A solution of this compound in dioxane exhibits a bluish fluorescence. A solution in ethanol shows in the ultraviolet three extinction maxima at the following wave lenghs: $\lambda=350$ m$\mu$, $\lambda=362$ m$\mu$ and $\lambda=380$ m$\mu$.

The acylamino compound of Formula 3 used as starting material can be prepared as follows:

369 parts of 1-amino-2-hydroxy-5-methylbenzene, 208 parts of malic acid and 2000 parts of chlorobenzene are stirred in the absence of air for 8 hours at the gentle boil, during which the water of reaction is distilled off. The mixture is then allowed to cool, and the resulting condensation product is filtered off, washed with ethanol and benzene and dried. The acyl compound is obtained in the form of a bright crystalline powder melting at 230° C.

EXAMPLE 2

123 parts of 1-amino-2-hydroxy-5-methylbenzene and 67 parts of malic acid are stirred at the boil into 700 parts by volume of xylene with the exclusion of air, the water formed being continuously distilled off. When 18 parts of water have been distilled off, 3 to 4 parts of para-toluene sulfonic acid are added, and further water is distilled off, while boiling and stirring, until the formation of water has completely ceased, that is to say for 24 to 36 hours. The mixture is allowed to cool, and the precipitated crystalline condensation product is filtered off and washed with xylene, alcohol and water. After being recrystallized from a mixture of methylene chloride and alcohol, the $\alpha:\beta$-di-[5-methyl-benzoxazolyl-(2)]-ethylene obtained in the form of fine yellowish needles melts at 183 to 184° C. and shows the ultraviolet absorption maxima given in Example 1.

EXAMPLE 3

86 parts of 1-amino-2-hydroxy-5-methylbenzene are stirred with the exclusion of air with 47 parts of malic acid in 500 parts by volume of xylene. The mixture is then boiled under reflux for one hour, while stirring, the separation of water occurs immediately. 2 parts of boric acid are then added, and the reaction mixture is refluxed for a further 3 hours. The resulting solution is cooled to 10° C., whereupon $\alpha:\beta$-di-[5-methyl-benzoxazolyl-(2)]-ethylene precipitates in the form of yellowish needles. After being recrystallized from isopropanol, the product melts at 183 to 184° C. and possesses the absorption maxima in the ultraviolet as indicated in Example 1.

Alternatively, the boric acid may be added at the outset to the reaction mixture, and cumene may be used instead of xylene.

EXAMPLE 4

Paper or cardboard is brushed with a nitro-cellulose-ester lacquer containing 0.01 percent of $\alpha:\beta$-di-[5-methyl-benzoxazolyl-(2)-ethylene. When the lacquer has dried, the material so treated has a brighter appearance than material treated in the same manner but without the addition of the oxazole compound.

EXAMPLE 5

0.25 part of $\alpha:\beta$-di-[5-methyl-benzoxazolyl-(2)-]-ethylene is added to 100 parts of an acetyl-cellulose mass having an acetyl-cellulose content of 25 percent. A film produced from this mass has a brighter appearance than a film similarly produced but not containing the oxazole compound.

EXAMPLE 6

12 parts of $\alpha:\beta$-di-[5-methyl-benzoxazolyl-(2)]-ethylene, 12 parts of the addition product of about 30 molecular proportions of ethylene oxide with a mixture of saturated fatty alcohols predominantly containing 18 carbon atoms and 76 parts of water are worked up into a finely dipersed paste. 50 grams of polyacrylonitrile fabric ("Orlon") are treated in a bath containing in 1500 cc. of water, 3 grams of formic acid of 85 percent strength, 3 grams of sodium chloride and 0.1 gram of the aforesaid paste for 30 minutes.

A similar effect is produced by treating the artificial yarn "Thermovyl."

EXAMPLE 7

0.15 part of $\alpha:\beta$-di-[5-methyl-benzoxazolyl-(2)]-ethylene dissolved in 2 parts of dimethyl-formamide is added to a solution of 150 parts of a polyacrylnitrile powder ("Orlon" powder) and 1000 parts of dimethyl-formamide. A film produced from the resulting mass has a brighter appearance than a film made in the same manner but without the addition of the oxazolyl compound.

EXAMPLE 8

"Thermovyl" yarn is washed for 30 minutes at 90° C. in a bath containing, per liter, 5 grams of soap containing 0.3 percent of $\alpha:\beta$-di-[5-methyl-benzoxazolyl-(2)]-ethylene. After being rinsed and dried, the washed material has a brighter appearance than a yarn washed in the same manner with soap alone.

EXAMPLE 9

A soap is prepared containing 0.3 percent of $\alpha:\beta$-di-[5-methyl-bennzoxazolyl-(2)]-ethylene.

Polyester fibers, for example "Terylene" fibers, which are washed with this soap have a brighter appearance than material washed with the soap alone.

A similar effect is obtained by adding per liter of washing liquor 0.5 gram of active chlorine in the form of sodium hypochlorite.

Instead of soap, there may be used a detergent preparation having the following composition:

|  | Percent |
| --- | --- |
| Soap | 33.3 |
| Anhydrous sodium carbonate | 11.0 |
| Sodium pyrophosphate | 14.0 |
| Sodium perborate | 7.0 |
| Magnesium silicate | 3.0 |
| $\alpha:\beta$-di-[5-methyl-benzoxazolyl-(2)]-ethylene | 1.0 |

30.7 percent of water, or a synthetic detergent may be used.

EXAMPLE 10

12 parts of $\alpha:\beta$-di-[5-methyl-benzoxazolyl-(2)]-ethylene are worked up into a finely dispersed paste with 12 parts of an addition product of about 30 molecular proportions of ethylene oxide with a mixture of saturated fatty alcohols containing preponderantly 18 carbon atoms and with 76 parts of water.

Polyester fibers, for example, "Dacron" fibers, are treated at a goods-to-liquor ratio of 1:30 with 0.2 percent of the above paste in a bath containing 1 cc. of ammonia solution per liter, for 30 minutes at 60 to 100° C., and the material is then rinsed and dried. It has a brighter appearance than untreated material.

Instead of the addition product mentioned above, there may be used another dispersing agent, for example, a condensation product of naphthalene sulfonic acid with formaldehyde.

EXAMPLE 11

100 parts of a polyester fabric, for example, a "Terylene" fabric, are treated for one hour at 60 to 90° C. in a bath containing in 3 liters of water 6 grams of formic acid of 85 percent strength, 6 grams of sodium chlorite and 0.7 gram of the paste described in Example 6, and the fabric is then rinsed and dried.

The fabric so treated has a higher content of white than the fabric treated in the same manner but without the addition of the dibenzoxazole compound.

By using, instead of formic acid and sodium chlorite, 15 cc. of peracetic acid of 40 percent strength a similar effect is obtained.

EXAMPLE 12

A "Terylene" fabric is treated at 80 to 90° C. with a dressing liquor containing in 1 liter of water, 20 grams of potato starch, 1 cc. of ammonia solution of 24 percent strength and 0.5 gram of the paste described in the first paragraph of Example 6.

After squeezing and drying the fabric, it exhibits a brighter appearance than a fabric treated with potato starch alone.

EXAMPLE 13

A detergent is made by dry-grinding of

|  | Parts |
| --- | --- |
| Dodecylbenzenesulfonate | 15 |
| Sodium laurylsulfate | 15 |
| Sodium tripolyphosphate | 35 |
| Anhydrous sodium sulfate | 28 |
| Sodium metasilicate | 5 |
| Carboxymethylcellulose | 2 |

100 grams of this synthetic detergent are dissolved in 1 liter of water at 70 to 80° C.

A solution is prepared of 200 mg. of $\alpha:\beta$-di-[5-methyl-benzyloxazolyl-(2)]-ethylene in 3 g. of a non-ionic dispersant (for example an adduct of 1 mol of a para-nonylphenol with about 10 mols of ethylene oxide at 130° C.). This solution is stirred into the solution of the aforedescribed synthetic detergent. The resulting brightener-containing detergent solution is dried in a spray-drier.

When polyamide fibers (e.g. nylon, "Perlon") or textiles made from acetate rayon or triacetate rayon, polyester, polyvinylchloride, polypropylene fibers or cotton are washed at a goods-to-liquor ratio of 1:20 for 15 to 30 minutes at 60 to 70° C. in a liquor containing per liter 8 g. of this brightener-containing detergent, said substrata are distinctly to strongly optically brightened.

The brightening effect achieved is even increased by several washing operations with the brightener-containing detergent.

There may be added to the afore-described washing liquor 0.25 to 0.5 g. per liter of active chlorine in the form of an aqueous sodium hypochlorite solution. Unless the textile material has been previously bleached, this produces a bleaching effect without impairing the optical brightening effect.

What is claimed is:

1. A crystalline product of manufacture consisting of pure $\alpha:\beta$-di-[methyl-benzoxazolyl - (2)] - ethylene, said product existing in the form of fine yellowish needles, and melting at 183 to 184° C., showing in ethanol solution extinction maxima at the wave lengths of $\lambda=350$ m$\mu$, $\lambda=362$ m$\mu$ and $\lambda=380$ m$\mu$, said product in dioxane solution exhibiting a bluish fluorescene, said product being an optical brightening agent.

References Cited

UNITED STATES PATENTS

| 2,875,080 | 2/1959 | Ackermann et al. |
| 2,072,908 | 3/1937 | Schneider. |
| 2,463,264 | 3/1949 | Graenacher et al. |
| 2,483,392 | 10/1949 | Meyer et al. |
| 2,488,289 | 11/1949 | Meyer et al. |
| 2,620,282 | 12/1952 | Fry et al. |
| 2,873,206 | 2/1959 | Geigy et al. |

FOREIGN PATENTS

| 196,405 | 3/1958 | Austria. |

JOHN D. RANDOLPH, Primary Examiner

U.S. Cl. X.R.

106—176; 117—33.5 T; 252—137, 152, 301.2 W; 260—37 R, 559 R